Patented Apr. 24, 1951

2,549,947

UNITED STATES PATENT OFFICE 2,549,947

HEMI-DIETHYLENE GLYCOL ADDUCT OF 3,12 - DIHYDROXY - 7 - KETOCHOLANIC ACID AND PREPARATION THEREOF

Benjamin F. Tullar, East Greenbush, N. Y., assignor to Sterling Drug Inc., New York, N. Y., a corporation of Delaware No Drawing. Application September 14, 1949, Serial No. 115,770

2 Claims. (Cl. 260—397.1)

This invention relates to an improvement in the process for preparation of 3,12-dihydroxy-7-ketocholanic acid, an important intermediate in the manufacture of desoxycholic acid. This invention also relates to a new compound, the hemi-diethylene glycol adduct of 3,12-dihydroxy-7-ketocholanic acid, useful as an intermediate to allow direct manufacture of desoxycholic acid by avoiding extensive purification of oxidation products of cholic acid.

The preparation of desoxycholic acid involves partial oxidation of cholic acid (3,7,12-trihydroxycholanic acid) to 3,12-dihydroxy-7-ketocholanic acid followed by reduction of the latter, usually by the Wolff-Kishner method, to desoxycholic acid (3,12-dihydroxycholanic acid). It is necessary, in order to realize the process in satisfactory yield, to isolate and purify the intermediate keto acid before proceeding with the reduction. This has previously entailed such operations as recrystallization of the keto acid and/or its conversion to a solid derivative such as its hydrazone or semicarbazone.

I have found that 3,12-dihydroxy-7-ketocholanic acid forms an adduct on simple admixture with diethylene glycol. This adduct is sparingly soluble in diethylene glycol/ethyl acetate mixtures, and the formation and isolation of this adduct affords a convenient way of separating 3,12-dihydroxy-7-ketocholanic acid from the other acids formed in the partial oxidation of cholic acid. The adduct is obtained by forming a solution of the crude 3,12-dihydroxy-7-ketocholanic acid in ethyl acetate containing a several-fold excess of diethylene glycol over the theoretical amount needed for forming the adduct, whereby on standing at below about 30° C., the adduct crystallizes from solution and is isolated, for instance by filtration or centrifugation.

The adduct thus obtained can be used directly for the preparation of desoxycholic acid by substituting it for the purified 3,12-dihydroxy-7-ketocholanic acid used in the prior methods described in the literature. Alternatively, the diethylene glycol can be removed from the adduct by dissolving it in alkali and acidifying, whereby the pure 3,12-dihydroxy-7-ketocholanic acid precipitates in hydrated form and can be rendered anhydrous by warming in a vacuum oven.

Ethyl acetate can be used to recrystallize the hemi-diethylene glycol adduct which can thus be obtained in the pure form having the melting point 150–151° C. with a neutral equivalent of 460. This indicates that in this substance there are two molecules of keto acid for every one of diethylene glycol. The empirical formula is $C_{24}H_{38}O_5 \cdot 1/2(HOCH_2CH_2OCH_2CH_2OH)$. Its sharp and easily reproducible melting point as well as the fact that it can be recrystallized without alteration or decomposition proves it to be a definite chemical compound and not a mixture or an unstable molecular aggregation.

The particular procedure used for partial oxidation of the cholic acid, of the several methods available in the prior art, is not critical.

The new diethylene glycol adduct of 3,12-dihydroxy-7-ketocholanic acid can be produced from the crude partially-oxidized product prepared by any of the oxidation methods heretofore used; for example, by reaction of cholic acid with chromic oxide, or bromine, or by bacterial oxidation. As an alternative, the partial oxidation can be carried out with the cholic acid in the form of a 3-ester derived from any readily available acid. In this way the 3-hydroxyl group is protected against oxidation. Useful 3-acylcholic acids for this modification include cholic acid 3-acetate, cholic acid 3-benzoate and cholic acid 3-succinate. After the partial oxidation the 3-ester of the crude 7-keto acid is saponified and the ethylene glycol adduct is formed as described herein.

The following examples will illustrate my invention more fully.

Example 1

Cholic acid (108 g. or 0.25 mole of 94% purity) was dissolved in a solution of 10.8 g. of sodium hydroxide in 500 cc. of water. Sodium bicarbonate (70 g.) was then added and the solution was cooled to 0° C. To this solution with good stirring 100 g. of ice was added followed by 50 g. (16 cc.) of bromine dropwise over a period of 30–60 minutes. Chloroform (10–20 cc.) was added occasionally to control foaming. A temperature of 0±3° C. was maintained during the addition and for an additional five hours. The reaction mixture could be allowed to stand overnight at 5–10° C. at this stage with no effect on the yield or quality of the product. The cholic acid contained a little alkali insoluble material which could be removed by filtration at this point or, if preferred, before the addition of bromine. Excess bromine was destroyed by the addition of a little sodium bisulfite. The filtrate at 0–5° C. was then covered with 200 cc. of ethyl acetate, and concentrated hydrochloric acid was added dropwise until the mixture reacted definitely acid to Congo red. The aqueous layer was separated and extracted with another 200 cc.

portion of ethyl acetate after saturating the aqueous layer with sodium chloride. The combined ethyl acetate extracts were warmed, decolorized with activated charcoal and filtered. The filtrate was concentrated to dryness in vacuo and most of the ethyl acetate was recovered. The vacuum dried residue was dissolved in 150 cc. of ethyl acetate and treated with 25 cc. of diethylene glycol. Crystallization of the addition compound started at once but was complete only after 10–12 hours at 20–25° C. The precipitate was collected by filtration, washed with a little cold ethyl acetate and dried giving 70–72 g. of hemi-diethylene glycol adduct of 3,12-dihydroxy-7-ketocholanic acid. This product was sufficiently pure for use in reduction to desoxycholic acid, but if desired it can be recrystallized from hot ethyl acetate; the pure addition compound has the M. P. 150–151° C. and a neutral equivalent of 460.

*Example 2*

Cholic acid (108 g.) dried by boiling with benzene and concentrating to dryness in vacuo, was dissolved in 50 cc. of pyridine at 95° C.; 28 g. of succinic anhydride was then added, and the mixture was kept at 90–95° C. on a steam bath for 45 minutes at which time the reaction mixture set to a solid mass. The excess pyridine was removed by heating in vacuo for 15 minutes. The residue was dissolved in one liter of water containing 47 cc. of 35% sodium hydroxide solution; a clear solution was obtained after about one hour of vigorous stirring. Sodium bicarbonate (80 g.) was then added, the solution was cooled to 0° C. and 42 g. (13.5 cc.) of bromine was added, and the mixture was stirred for four hours at 0.5° C. and overnight at room temperature. A little sodium bisulfite was added followed by 100 cc. of 35% sodium hydroxide solution, and the solution was heated at 90–95° C. for one hour to allow pyridine to distil off. The solution was then cooled to 5° C. and acidified by addition of concentrated hydrochloric acid under a layer of ethyl acetate. The acidic product was extracted with ethyl acetate, and the ethyl acetate extracts were worked up as described in Example 1. The total yield of hemi-diethylene glycol adduct of 3,12-dihydroxy-7-ketocholanic acid was 87 g. (75%), M. P. 146–150° C.

I claim:

1. The hemi-diethylene glycol adduct of 3,12-dihydroxy-7-ketocholanic acid having the empirical formula $$C_{24}H_{38}O_5 \cdot 1/2(HOCH_2CH_2OCH_2CH_2OH)$$

and the melting point about 150–151° C. when pure.

2. The method of separating 3,12-dihydroxy-7-ketocholanic acid from a mixture of partially-oxidized cholic acids which comprises forming a solution of the mixture of the partially-oxidized cholic acids in ethyl acetate containing diethylene glycol, cooling said solution to a temperature below about 30° C., whereby the hemi-diethylene glycol adduct of 3,12-dihydroxy-7-ketocholanic acid crystallizes, and separating the crystalline adduct from the mother liquor.

BENJAMIN F. TULLAR.

REFERENCES CITED

The following references are of record in the file of this patent:

UNITED STATES PATENTS

| Number | Name | Date |
| --- | --- | --- |
| 2,374,680 | Hoehn | May 1, 1945 |